May 25, 1971  R. J. DUFFY  3,579,684
METHODS OF MAKING SELF-LOCKING THREADED ELEMENTS
Original Filed April 5, 1967  2 Sheets-Sheet 1
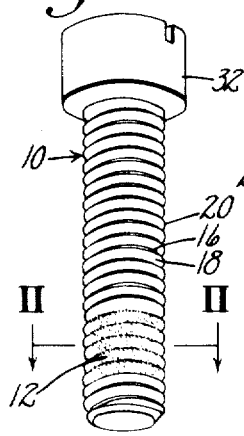
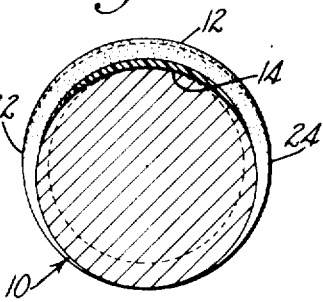
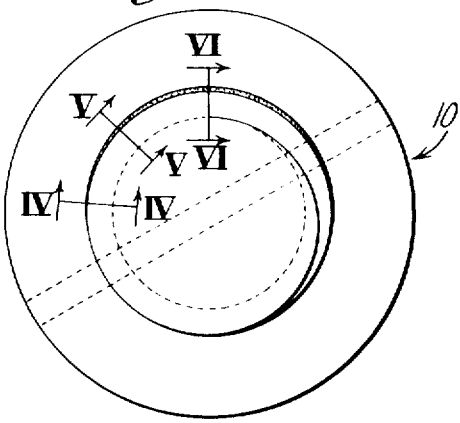
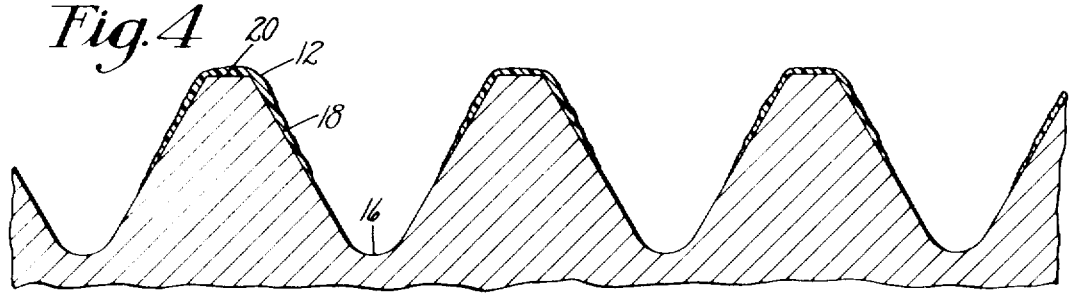
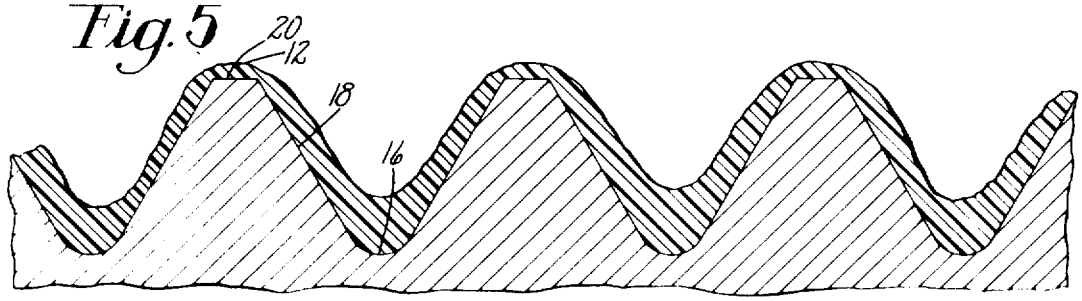
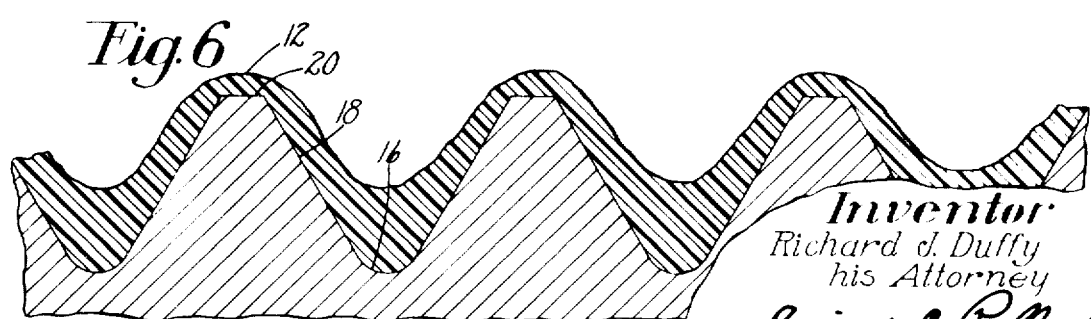
Inventor
Richard J. Duffy
his Attorney
Benjamin C. Pollard

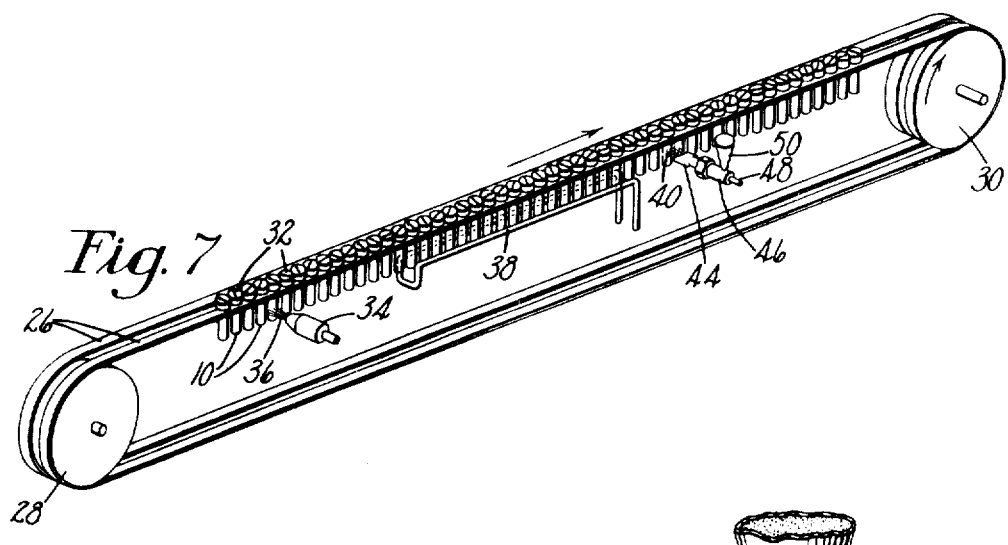
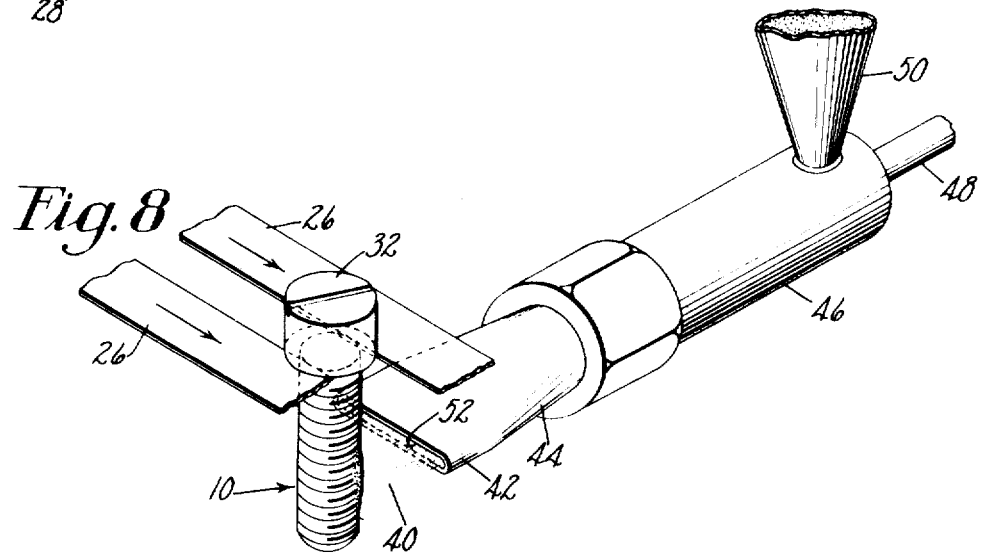

United States Patent Office 3,579,684
Patented May 25, 1971

3,579,684
METHODS OF MAKING SELF-LOCKING THREADED ELEMENTS
Richard J. Duffy, Salem, Mass., assignor to USM Corporation, Flemington, N.J., and Boston, Mass.
Original application Apr. 5, 1967, Ser. No. 628,683, now Patent No. 3,498,352, dated Mar. 31, 1970. Divided and this application Nov. 25, 1968, Ser. No. 778,636
Int. Cl. B23g 9/00; B21k 1/44, 1/56, 1/64
U.S. Cl. 10—10     9 Claims

ABSTRACT OF THE DISCLOSURE

Method of making a self-locking threaded alement, e.g. a screw including a strongly adhered convexly curved plastic body on its threaded surface allowing smooth assembly and giving strong frictional engagement between the element and a mating threaded surface. In the method, a stream of fine particles of heat-softenable plastic is directed against a threaded surface portion of a heated metallic element. Contacting particles are caught on the heated surface and fused by heat from the element to form a continuous plastic body which is then hardened by cooling.

---

This application is a division of my copending application Ser. No. 628,683 entitled "Self-Locking Threaded Elements" filed Apr. 5, 1967, now U.S. Patent No. 3,498,352, dated Mar. 31, 1970.

BACKGROUND OF THE INVENTION

Field of the invention

This invention relates to improvements in methods of making self-locking threaded elements in which deformable plastic is secured on the threaded surface of the element in a relation to give strong locking action between the element and a mating threaded surface.

Description of the prior art

It has been proposed heretofore to secure a body of plastic directly to the threaded surface of a fastener element by disposing plastic material in the desired location relative to the fastener element by a positioning device such as a die, cavity or mask and thereafter heating or heating and pressing to fuse the plastic material to the surface of the thread. Although the plastic body so attached provided a locking action, the steps of bringing the fastener element into register with the die, cavity or mask and supplying the plastic were time consuming and expensive.

SUMMARY OF THE INVENTION

It is an object of the present invention to provide a simple, rapid and inexpensive method for making a self-locking threaded element by forming a body of plastic on the threaded surface of a threaded element in a shape providing for easier assembly of the element with a mating threaded surface and providing superior resistance to displacement.

It is a further object to provide a method in which bringing into register the threaded element and a plastic positioning device is not required and in which a high rate of production of improved self-locking threaded elements is obtainable.

To these ends and in accordance with a feature of the present invention I have formed an improved locking plastic deposit on a threaded element by directing a stream of fine particles of plastic against a heated surface of the element which holds and fuses them to provide a strongly adhered plastic body.

BRIEF DESCRIPTION OF THE DRAWING

The invention will be described further in connection with the attached drawings in which:

FIG. 1 is an angular view of one form of self-locking threaded fastener element made in accordance with the method of the present invention;

FIG. 2 is a cross sectional view on a larger scale on the line II—II of FIG. 1;

FIG. 3 is a bottom end view on a larger scale of the fastener element of FIG. 1;

FIG. 4 is a fragmentary view in longitudinal section and on a much enlarged scale taken on the line IV—IV of FIG. 3 showing the distribution of plastic material on the threads of the fastener element near one longitudinal edge of the plastic deposit;

FIG. 5 is a fragmentary view in longitudinal section and on a much enlarged scale taken on the line V—V of FIG. 3 showing the distribution of plastic material on the threads of the fastener element intermediate of the longitudinal edge and the longitudinal center line of the plastic deposit;

FIG. 6 is a fragmentary view in longitudinal section and on a much enlarged scale taken on the line VI—VI of FIG. 3 showing the distribution of plastic material on the threads of the fastener element at the longitudinal center line of the plastic deposit;

FIG. 7 is a diagrammatic elevational view illustrating apparatus useful for practicing the method of the present invention for forming a plastic deposit on the threaded surface; and FIG. 8 is a diagrammatic fractional elevational view on a larger scale illustrating one form of plastic particle applying station for use in practicing the method of the present invention.

DESCRIPTION OF THE PREFERRED EMBODIMENTS

The invention will be described in relation to providing a self-locking plastic body on a threaded bolt, but it is to be understood that it is useful in providing a self-locking body on threaded portions of other articles.

A locking type threaded element, shown as a bolt 10, (see FIGS. 1 and 2), manufactured according to the present method carries a deposit 12, i.e. a "retarder patch" or plastic body of tough resilient resin formed in situ on a selected area of the threaded surface of the fastener by deposition and fusion of fine particles of thermoplastic resin on a heated surface of the fastener. A thin, heat-softenable film 14 of primer or tying material disposed on the selected area between the surface of the fastener or bolt 10 and the retarder patch 12 may be provided to aid in deposition of the plastic particles in the course of making and to give superior adhesion between the fastener surface and the retarder patch. The retarder patch 12 covers the valleys 16, the inclined helical bearing surfaces 18 and the crests 20 of the threaded surface and is so located as to be compressed between the threaded surface of the fastener and mating threads of a complementary element with which the fastener is assembled to provide increased frictional resistance to undesired loosening of the threaded engagement between the fastener and the complementary element. As shown particularly in FIG. 2, the exposed surface of the retarder patch 12 extends in a substantially continuous convex curve from one axially extending edge 22 to the opposite edge 24. Thus the radial thickness of the patch is greatest substantially midway between the longitudinal edges and diminishes in thickness adjacent these edges so that the exposed surface of the patch forms only a small angle to the threaded surfaces at these longitudinal edges. This conformation is important to allow easy engagement of the fastener 10 with a complementary element and superior resistance to undesired loosening of the threaded engagement. Furthermore the radial thickness of the retarder patch from the threaded surface of the fastener to the exposed surface of the patch is less at the crests 20 than on the inclined helical bearing surfaces forming the valleys 16. Surprisingly, as shown in FIG. 2, the deposited plastic extends farther in a circumferential direction adjacent the crests 20 of the threads than it does in the valleys 16, so that the axially extending edges are of serrated outline with the points of the serrations at the crests 20.

The novel distribution of plastic on the threaded surfaces of the fastener element can best be understood from FIGS. 4, 5 and 6. Near the longitudinal edge of the patch (FIG. 4) the patch 12 is very thin at the crests of the threads and extends only part-way down the bearing surface or sides 18 of the threads. No or substantially no plastic is adhered to the valleys 16 or root portion of the threads.

Along a line intermediate between the longitudinal edge and the longitudinal center line of the patch (FIG. 5), the deposit at the crests 20 of the threads is still relatively thin although thicker than that adjacent the edge and the plastic deposit on the bearing surfaces or sides 18 of the threads is thicker than on the crests 20. The deposit of plastic in the valleys 16 of the threads is thicker than on the crests and on the sides but is not so thick as to greatly alter the thread appearance.

Along the center line (FIG. 6), the plastic at the crests 20 of the threads is still relatively thin although slightly thicker than that at the intermediate line. Also the plastic is thicker on the sides 18 and in the valleys 16 of the threads than on comparable areas at the intermediate line but is still not of such thickness as markedly to alter the thread appearance.

It will be observed that by reason of the novel distribution of plastic on the threaded surface, a high proportion of the deposited plastic is disposed on the bearing surfaces or sides 18 of the threads where it is effective to provide locking pressure even when the threaded element is tightly sealed and that there is less material at the crests 20 of the threads. It has been found that excessive material at the crests of the threads interferes with ease of assembly while not contributing greatly to the resistance to loosening of threaded engagement with a complementary threaded surface. That is, plastic material on the crests 20 of the threads presents little strength against axial forces tending to dislodge it. On the other hand, since the plastic deposit on the bearing surfaces or sides 18 of the threads extends further in a circumferential direction and is a greater distance from the center of rotation than material in the valleys 16, i.e. at the roots of the threads, the plastic deposit provides a more effective moment arm to resist loosening of the threaded engagement than where the same amount of material is disposed in relation to fill the space between successive thread crests 20.

The process of making such locking type fasteners will be described as it is practiced using the apparatus diagrammatically shown in FIG. 7, but it will be understood that other apparatus than that shown may be used, or the process may be carried out by hand. In the apparatus threaded fastener elements shown as bolts 10 are conveyed on a carrier through the successive steps of the process. The carrier includes spaced parallel endless belts 26 traveling on pulley wheels 28 and 30. The fasteners preferably are suspended in vertical position with portions of the heads 32 resting on the spaced parallel moving belts 26 with depending portions exposed for treatment.

The fasteners 10 are first moved past a spray device 34 for applying a primer or tying coat. The spray device 34 directs a fine spray 36 of the primer liquid against the area of the bolt 10 on which the plastic deposit is to be formed. The spray rate and speed of movement of the bolt past the spray are controlled to provide on the bolt a coating of a primer liquid sufficient to form a thin but substantially continuous primer layer 14 after drying.

The primer layer 14 on the bolt 10 is dried and the bolt is carried to a heating station. The heating station may be an oven but preferably is a high frequency field heating unit 38 designed to heat a succession of bolts 10 moving continuously past it on the carrier. As shown, in the drawing, the coil of the heating unit 38 is elongated in the direction of movement of the fasteners 10 on the carrier to provide adequate heating time for the moving fasteners to raise them to the desired temperature.

From the heating station the bolts 10 are next moved to a station at which fine plastic particles are applied. At this station, fine plastic particles suitably as a uniform stream 40, are directed at the heated bolts 10. The particles applied are not confined or restrained by a mold or other shaping device but are freely movable into engagement with the crests and valleys of the threaded surfaces of the bolts. Because of this fact, the particles deposit a layer in which the material is in a desirable relationship to the threaded surface both to allow easy installation, i.e. assembly with a complementary threaded element and strong holding power on the first and subsequent uses. The velocity of the particles in the stream should be kept in the range of about 5 to 50 ft. per second, preferably within about 10 to 20 ft. per second for deposition on the bolts. Particles are caught and held on the hot surface and are then fused to a continuous coherent mass by the sensible heat of the bolts 10. When the bolt 10 and body 12 of plastic material have cooled the plastic is in the form of a coherent tough resilient patch covering crests 20, sides 18, and valleys 16 of the threaded surface.

The thin film 14 of heat softenable primer or tying material on the portion of the threaded fastener on which the patch 12 is to be formed has been found an important factor both in forming the patch and in the integrity of the finished article. Heating of the threaded fastener to a temperature above the softening point of the film and above the softening point of the plastic particles from which the patch is to be formed, facilitates forming the resin patch from a stream of fine plastic particles directed against the threaded element. That is, resin particles are collected more effectively and uniformly on the heat softened surface of the treated portion of the threaded element. When the collected particles are fused by the sensible heat of the threaded element, the plastic patch formed covers the desired surface portion of the threaded element uniformly even over the crests of the threads and adheres strongly to it so as not to be displaced when the threaded element is assembled with a complementary threaded element in use.

An important consideration is that the primer or tying agent be softenable at the temperature to which the threaded element is raised prior to contact with the plastic particles, and that it be capable of wetting or contain an agent to bring it into wetting relation to the surface of the threaded element. The primer or tying agent may be a permanently thermoplastic resin or may be a curing type resin in uncured condition up to the time of application of the resin particle to form the patch. A wide variety of heat softenable resin primer or tying agents may be used such, for example, as polyamide resins, epoxy resins, resorcinol aldehyde resins and combinations of these. The primer or tying agent may be applied to the selected area of the threaded element in solution in a volatile solvent for the primer or tying material. For example, a 10% solids solution of an alcohol soluble nylon in denatured alcohol gives good results. The amount of treating agent applied is preferably only enough to form a substantially continuous wetted surface on the selected area and may be an amount giving a coating on the order of 1/10 mil in dry thickness.

The main body of the patch is formed of tough resilient heat softenable plastic materials. Polyamide and polyester resins have been found particularly useful and the preferred polyamide resins include nylon 11 or nylon 66. The plastic materials are applied in the form of fine particles. The size of the particles to be used depends to some extent on the size of the threaded element to which the patch is to be applied. The smaller the threaded element the smaller the particles desired. For a 3/8" threaded bolt, a useful range of particle sizes is such that only about 2% would be retained on a No. 140 sieve. It is preferable that not more than about 15% of the particles be capable of passing through a No. 325 sieve.

The procedure for forming a patch involves heating the threaded fastener element to a temperature at which the primer or tying material on its surface is softened and at which the threaded element will have sufficient sensible heat to fuse powdered plastic material. Where the powdered plastic is nylon 11, which has a melting point of 367° F., temperatures in the range of from 450° to 650° F. have been found satisfactory. It is desirable that the temperature to which the fastener element is heated be such that the sensible heat is sufficient to keep the temperature above about 200° F. for at least about 20 seconds.

Heating of the threaded element, for example, a bolt is preferably effected by a high frequency electric field, but the bolt may be heated in an oven or by other heating means. It has been found that at a frequency of 450 kilocycles, a steel bolt can be brought to the desired temperature in from 2 to 3 seconds. In a continuous process, the bolt may be passed through the high frequency field at a rate providing the desired heating time.

Directly after the threaded element 10 has been heated the plastic particles are applied to the selected area. In the preferred form, this operation involves continuous movement of the threaded element 10 to cause the desired area to pass through a stream 40 of plastic particles. It appears that the plastic particles deposit on and are held by heat softened film of primer or tying agent on the surface of the threaded element. A greater thickness of plastic particles is collected in the portion of the threaded surface which is at right angles to the stream of particles and the thickness becomes progressively less toward the portions approaching tangency to the stream. The particles are then fused by the sensible heat of the threaded element to a continuous patch which is thickest midway between the edges tapering smoothly toward the edges so that the surface extends in a smooth convex curve and the surface is at only a small angle to the threaded surface at the edges. The patch firmly adheres to the threaded element so that it is not displaced in subsequent assembly of the threaded element with a complementary threaded element.

FIG. 8 shows a device for directing particles laterally against the surface of a fastener. In the drawing this is shown as a horizontal stream 40 of particles directed against a bolt 10 arranged with its axis vertical. The bolt is suspended by its head 32 on the spaced carrier belts 26 which move it past the stream of particles. The spray device shown includes a jet nozzle 42 formed as the flattened end of a tubular member 44 secured to one end of a tubular manifold 46, an inlet 48 for supplying a gas under pressure to the manifold 46 and an inlet 50 through which the plastic particles are introduced. The opening 52 in the flattened portion 42 of the tube 44 is oriented with its long axis parallel to the direction of movement of the bolt 10 to provide a relatively wide, preferably substantially parallel edged stream 40 of particles through which the bolt is moved. The dimensions of the wide portion of the nozzle are chosen to control the time during which a bolt moving at a fixed rate on the carrier is subjected to the spray of particles and the vertical dimension of the nozzle is chosen to provide the desired axial length of plastic deposited on the bolt. It has been found that where the particles are projected against the fastener element a deposit is formed with more clearly defined edges than where the particles are in a falling stream. This may be due to the action of the jet in blowing off particles or the action of later particles in knocking off loosely held particles from portions of the fastener surface which are spaced from the center area where the jet of the plastic particles is more nearly tangent to the fastener surface.

The thickness of the patch 12 is controllable by the nature and rate of supply of particles in the stream, by the temperature of the fastener and by the speed at which the threaded element passes through the stream of particles. The thickness need only be enough to give holding pressure when squeezed between the mating surfaces of complementary threaded members. In general it is not desired to have a thickness of patch measured at the longitudinal center line, i.e. midway between the axially extending edges, of more than about .020 and preferably not more than about .005" on a fine thread 3/8 inch bolt since a greater thickness makes it harder to assemble the threaded element with a complementary element. Smaller bolts may preferably employ thinner patches and coarse thread bolts may tolerate somewhat thicker patches. Also in patches of excess thickness there is a swaging back of material from the patch which may collect in a manner to interfere with full tightening of the threaded element.

While as described above, the plastic particles are applied by moving the heated threaded element through a single stream of particles, it will be understood that the patch may be formed by moving the threaded element at a higher rate of speed through a series of streams of particles and that if desired these streams may comprise particles of different ranges of sizes or may be of different materials.

EXAMPLE

Screws 10, for torque test purposes were disposed with their enlarged head portions 32 resting on the two moving belts 26 and with the threaded portions extending down between the belts leaving the portions to be coated exposed as shown in FIG. 3. The screws were first carried past a spray device 34 which deposited a thin layer 14 of primer solution on exposed portions of the screws on which plastic patches were to be formed. The primer was a 10% solids solution in alcohol of an alcohol soluble nylon and an epoxy resin (Epon 828) in a ratio solids of 90:10 parts by weight. The deposited material on the screws was dried leaving very thin substantially continuous primer coats. The screws 10 were then conveyed in proximity to a high frequency field coil 38 operating at a frequency of about 450 kc. with a power source of 2 kw. capacity. In passing through the field the temperature of the screws reached about 600 F. Directly thereafter the screws were moved by the belts so that the primer coated area of the screws passed through a laterally directed stream 40 of powdered polyamide resin (nylon 11). The powder had a particle size distribution such that less than 2% were retained on a No. 70 sieve, 90% were retained on a No. 140 sieve and about 5% passed a No. 325 sieve. The heat softened primer layer 14 on the surface of the screws caught and held powder particles and the powder particles were fused by heat from the screws 10 to form firmly adherent plastic patches averaging about 0.004 inch in thickness along their center lines and tapering smoothly to the axially extending edges of the bodies. The plastic patches were approximately 0.25% in axial length and 0.25 in width.

On cooling, the screws were torque tested using Class 3 fit cadmium plated nuts and following the procedures set forth in Military Specification MIL-F-18240.

The results are listed in the following table.

| Screw | | | Nut | | Fit | Initial installation torque max., in./lbs. | Minimum removal torque, in./lbs. | | |
|---|---|---|---|---|---|---|---|---|---|
| Material | Finish | Diameter | Material | Finish | | | 1st | 5th | 15th |
| Steel | Black oxide | 3/8 | Steel | Cadmium plate | 3 | 70 | 60 | 43 | 24 |
| Stainless steel | None | 3/8 | ...do... | ...do... | 3 | 59 | 41 | 20 | 15 |
| Steel | Cadmium plate | 3/8 | ...do... | ...do... | 3 | 65 | 50 | 25 | 9.5 |

In each instance the initial installation torque and minimum removal torque obtained satisfied the applicable specifications, i.e. for the 3/8 inch screw the specified maximum initial installation torque is 80 inch pounds and the specified minimum removal torque on the fifteenth removal is 9.5 pounds.

Having thus described my invention, what I claim as new and desire to secure by Letters Patent of the United States is:

1. The method of providing a threaded portion of an article with a self-locking element comprising an adhered body of normally hard, tough, resilient thermoplastic resin, said method including the steps of heating the threaded portion to a temperature above the softening point of said resin, thereafter directing a stream of fine particles of said thermoplastic resin to a selected area of said threaded portion while said threaded portion is at a temperature above said softening point, catching resin particles from said stream by softening them and causing them to adhere to said threaded portion by heat from the surface of said threaded portion progressively to build up a deposit of resin on said selected area, the radial thickness of said deposit being greatest substantially midway between longitudinal edges of said deposit and diminishing in thickness towards those edges, fusing adhered particles to a substantially continuous body of resin, and cooling said body of resin to harden it to a solid body resistant to displacement and effective to give a locking action when a complementary threaded member is assembled with said threaded portion.

2. The method of providing a threaded portion of an article with a self-locking element as defined in claim 1 including the step of applying a thin, firmly adherent heat-softenable resin primer coat to said selected area of said threaded portion before heating said threaded portion and applying said stream of resin particles.

3. The method of providing a threaded portion of an article with a self-locking element as defined in claim 1 in which said stream of fine particles is a gaseous jet in which the fine particles are entrained.

4. The method of making a locking-type threaded fastener element including an adhered body of normally hard, tough, resilient thermoplastic resin comprising the steps of heating a threaded metallic fastener element to a temperature above the softening point of said resin, thereafter directing a stream of fine particles of said thermoplastic resin to a selected area of the threaded surface of said fastener element while said threaded portion is at a temperature above the softening point of said resin, catching resin particles from said stream by softening them and causing them to adhere to said fastener element by heat from the surface of said fastener element progressively to build up a deposit of resin on said selected areas, the radial thickness of said deposit being greatest substantially midway between longitudinal edges of said deposit and diminishing in thickness towards those edges, fusing adhered particles to a substantially continuous body of resin by sensible heat supplied from said fastener element, and cooling said body of resin to harden it to a solid body resistant to displacement and effective to give a locking action when said fastener element is assembled with a complementary threaded member.

5. The method of making a locking-type threaded fastener element as defined in claim 4 in which said fastener element is a bolt and is disposed with its axis substantially vertical for application of said thermoplastic resin and in which said stream of resin particles is directed laterally against the selected area of the threaded surface.

6. The method of making a locking-type threaded metallic fastener element as defined in claim 5 in which said fastener element is moved through said laterally directed stream of resin particles.

7. The method of making a locking-type threaded metallic fastener as defined in claim 6 in which said laterally directed stream of resin particles is a gaseous jet in which the resin particles are entrained.

8. The method of making a locking-type threaded metallic fastener element as defined in claim 4 including the step of applying a thin firmly adherent heat softenable resin primer coat to said selected area of said fastener element before heating said threaded portion and applying said stream of resin particles to said element.

9. The method of making a locking-type threaded metallic fastener element as defined in claim 6 including the step of applying a thin firmly adherent heat-softenable resin primer coat to said selected area of said fastener element before heating said threaded portion and applying said stream of resin particles to said element.

References Cited
UNITED STATES PATENTS

| | | | |
|---|---|---|---|
| 3,093,177 | 6/1963 | Villo | 151—7 |
| 3,294,139 | 12/1966 | Preziosi | 151—7 |
| 3,313,017 | 4/1967 | Zingali | 151—7 |
| 3,316,338 | 4/1967 | Rieke | 151—7 |
| 3,437,541 | 4/1969 | Cooper et al. | 151—7 |
| 3,311,085 | 3/1967 | Smith | 118—59 |

CHARLES W. LANHAM, Primary Examiner

E. M. COMBS, Assistant Examiner

U.S. Cl. X.R.

10—27, 86